(12) United States Patent
Strong et al.

(10) Patent No.: US 11,789,930 B2
(45) Date of Patent: *Oct. 17, 2023

(54) METHOD AND APPARATUS FOR A FILE SHARING AND SYNCHRONIZATION SYSTEM

(71) Applicant: Dropbox, Inc., San Francisco, CA (US)

(72) Inventors: Jack Benjamin Strong, Austin, TX (US); Gibu Thomas, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,259

(22) Filed: Feb. 23, 2022

(65) Prior Publication Data

US 2022/0179842 A1    Jun. 9, 2022

Related U.S. Application Data

(63) Continuation of application No. 14/872,004, filed on Sep. 30, 2015, now Pat. No. 11,334,555, which is a continuation of application No. 14/075,598, filed on Nov. 8, 2013, now Pat. No. 9,037,540, which is a continuation of application No. 13/757,024, filed on Feb. 1, 2013, now Pat. No. 8,600,934, which is a
(Continued)

(51) Int. Cl.
| | |
|---|---|
| *G06F 16/00* | (2019.01) |
| *G06F 16/23* | (2019.01) |
| *G06F 16/182* | (2019.01) |
| *G06F 16/176* | (2019.01) |
| *G06F 16/51* | (2019.01) |
| *G06F 16/48* | (2019.01) |

(52) U.S. Cl.
CPC ...... *G06F 16/2365* (2019.01); *G06F 16/1767* (2019.01); *G06F 16/182* (2019.01); *G06F 16/48* (2019.01); *G06F 16/51* (2019.01)

(58) Field of Classification Search
CPC ............... G06F 16/2365; G06F 16/182; G06F 16/1767; G06F 16/51; G06F 16/48
USPC .......................................................... 707/706
See application file for complete search history.

(56) References Cited

U.S. PATENT DOCUMENTS

| | | |
|---|---|---|
| 5,165,031 A | 11/1992 | Pruul et al. |
| 5,452,448 A | 9/1995 | Sakuraba et al. |
| (Continued) | | |

OTHER PUBLICATIONS

Notice of Allowance from U.S. Appl. No. 14/872,004, dated Feb. 22, 2022, 9 pages.
(Continued)

*Primary Examiner* — Jean M Corrielus
(74) *Attorney, Agent, or Firm* — Keller Preece PLLC

(57) ABSTRACT

A computer-implemented method is provided for managing and sharing picture files. In one embodiment of the present invention, the method comprises providing a server platform and providing a datastore on the server platform for maintaining full resolution copies of the files shared between a plurality of sharing clients. A synchronization engine is provided on the server platform and is configured to send real-time updates to a plurality of sharing clients when at least one of the sharing clients updates or changes one of said files. A web interface may also be provided that allows a user to access files in the datastore through the use of a web browser.

20 Claims, 5 Drawing Sheets

Related U.S. Application Data continuation of application No. 12/928,998, filed on Dec. 23, 2010, now Pat. No. 8,370,298, which is a continuation of application No. 12/157,772, filed on Jun. 13, 2008, now Pat. No. 7,885,925, which is a continuation of application No. 11/269,498, filed on Nov. 8, 2005, now abandoned.

(60) Provisional application No. 60/626,121, filed on Nov. 8, 2004.

(56) References Cited

U.S. PATENT DOCUMENTS

| | | |
|---|---|---|
| 5,862,346 A | 1/1999 | Kley et al. |
| 6,052,735 A | 4/2000 | Ulrich et al. |
| 6,125,369 A | 9/2000 | Wu et al. |
| 6,256,634 B1 | 7/2001 | Moshaiov et al. |
| 6,260,040 B1 | 7/2001 | Kauffman et al. |
| 6,272,545 B1 | 8/2001 | Flanagin et al. |
| 6,348,932 B1 | 2/2002 | Nishikawa et al. |
| 6,407,750 B1 | 6/2002 | Gioscia et al. |
| 6,467,034 B1 | 10/2002 | Yanaka |
| 6,496,979 B1 | 12/2002 | Chen et al. |
| 6,636,873 B1 | 10/2003 | Carini et al. |
| 6,636,888 B1 | 10/2003 | Bookspan et al. |
| 6,654,746 B1* | 11/2003 | Wong .......... G06F 16/182 709/219 |
| 6,725,281 B1 | 4/2004 | Zintel et al. |
| 6,757,696 B2* | 6/2004 | Multer .......... G06F 16/182 |
| 6,795,688 B1 | 9/2004 | Plasson et al. |
| 6,904,185 B1 | 6/2005 | Wilkins et al. |
| 6,938,076 B2 | 8/2005 | Meyer et al. |
| 7,039,723 B2 | 5/2006 | Hu et al. |
| 7,103,357 B2 | 9/2006 | Kirani et al. |
| 7,139,555 B2 | 11/2006 | Apfel |
| 7,143,194 B2 | 11/2006 | Curley et al. |
| 7,162,454 B1 | 1/2007 | Donner et al. |
| 7,228,352 B1 | 6/2007 | Yaguchi et al. |
| 7,263,712 B2 | 8/2007 | Spencer |
| 7,317,699 B2* | 1/2008 | Godfrey .......... H04L 51/10 370/254 |
| 7,319,536 B1 | 1/2008 | Wilkins et al. |
| 7,321,919 B2 | 1/2008 | Jacobs et al. |
| 7,369,161 B2 | 5/2008 | Easwar et al. |
| 7,372,485 B1 | 5/2008 | Bodnar et al. |
| 7,421,458 B1 | 9/2008 | Taylor et al. |
| 7,441,180 B1 | 10/2008 | Kaczmarek et al. |
| 7,502,795 B1 | 3/2009 | Svendsen et al. |
| 7,523,191 B1 | 4/2009 | Thomas et al. |
| 7,576,752 B1 | 8/2009 | Benson et al. |
| 7,644,124 B1 | 1/2010 | Porter |
| 7,680,067 B2 | 3/2010 | Prasad et al. |
| 7,707,500 B2 | 4/2010 | Martinez |
| 7,747,596 B2 | 6/2010 | Bigioi et al. |
| 7,773,106 B2 | 8/2010 | Serdy, Jr. et al. |
| 7,774,326 B2 | 8/2010 | Arrouye et al. |
| 7,809,682 B2 | 10/2010 | Paterson et al. |
| 7,873,353 B2 | 1/2011 | Kloba et al. |
| 7,885,925 B1 | 2/2011 | Strong et al. |
| 7,917,628 B2 | 3/2011 | Hesselink et al. |
| 7,930,270 B2 | 4/2011 | Tsang |
| 7,962,137 B2 | 6/2011 | Coppinger et al. |
| 7,962,622 B2 | 6/2011 | Friend et al. |
| 8,001,088 B2 | 8/2011 | Tawa, Jr. |
| 8,019,900 B1 | 9/2011 | Sekar et al. |
| 8,230,026 B2 | 7/2012 | Gilhuly et al. |
| 8,321,374 B2 | 11/2012 | Holt et al. |
| 8,341,345 B2 | 12/2012 | Tulskie et al. |
| 8,370,298 B2 | 2/2013 | Strong et al. |
| 8,392,472 B1 | 3/2013 | Gupta et al. |
| 8,600,934 B2 | 12/2013 | Strong et al. |
| 8,612,439 B2 | 12/2013 | Prahlad et al. |
| 8,620,861 B1 | 12/2013 | Uhrhane et al. |
| 8,650,498 B1 | 2/2014 | Mihovilovic |
| 8,965,847 B1 | 2/2015 | Chang |
| 9,037,540 B2 | 5/2015 | Strong et al. |
| 9,131,054 B2 | 9/2015 | Vendrow et al. |
| 9,501,762 B2 | 11/2016 | Babenko et al. |
| 9,817,878 B2 | 11/2017 | Newhouse |
| 10,057,318 B1 | 8/2018 | Rashid et al. |
| 10,158,708 B2 | 12/2018 | Strong et al. |
| 10,204,338 B2 | 2/2019 | Lee |
| 10,320,904 B2 | 6/2019 | Strong et al. |
| 2002/0013852 A1 | 1/2002 | Janik |
| 2002/0032722 A1* | 3/2002 | Baynes, Jr. .......... G06F 16/2386 709/202 |
| 2002/0044159 A1 | 4/2002 | Kuroiwa et al. |
| 2002/0059604 A1 | 5/2002 | Papagan et al. |
| 2002/0065848 A1 | 5/2002 | Walker et al. |
| 2002/0066050 A1 | 5/2002 | Lerman et al. |
| 2002/0099772 A1 | 7/2002 | Deshpande et al. |
| 2002/0129096 A1 | 9/2002 | Mansour et al. |
| 2002/0161860 A1* | 10/2002 | Godlin .......... G06F 16/1767 709/219 |
| 2002/0184264 A1 | 12/2002 | Berg et al. |
| 2002/0198858 A1 | 12/2002 | Stanley et al. |
| 2003/0004952 A1 | 1/2003 | Nixon et al. |
| 2003/0014478 A1 | 1/2003 | Noble |
| 2003/0018725 A1 | 1/2003 | Turner et al. |
| 2003/0028610 A1 | 2/2003 | Pearson |
| 2003/0037114 A1 | 2/2003 | Nishio et al. |
| 2003/0041094 A1 | 2/2003 | Lara et al. |
| 2003/0055825 A1 | 3/2003 | Chen et al. |
| 2003/0058277 A1 | 3/2003 | Bowman-Amuah |
| 2003/0065721 A1 | 4/2003 | Roskind |
| 2003/0074418 A1 | 4/2003 | Coker |
| 2003/0097361 A1 | 5/2003 | Huang et al. |
| 2003/0120680 A1* | 6/2003 | Agrawal .......... H04L 69/329 |
| 2003/0131098 A1 | 7/2003 | Huntington et al. |
| 2003/0154187 A1* | 8/2003 | Hayakawa .......... G06F 16/273 |
| 2003/0159136 A1 | 8/2003 | Huang et al. |
| 2003/0172127 A1 | 9/2003 | Northrup et al. |
| 2003/0182329 A1* | 9/2003 | Sato .......... G06F 11/1466 |
| 2003/0217181 A1 | 11/2003 | Kiiskinen |
| 2003/0218633 A1 | 11/2003 | Mikhail et al. |
| 2004/0015401 A1* | 1/2004 | Lee .......... G06Q 30/02 705/16 |
| 2004/0024979 A1 | 2/2004 | Kaminsky et al. |
| 2004/0044732 A1 | 3/2004 | Fushiki et al. |
| 2004/0044799 A1* | 3/2004 | Sivaraman .......... G06F 16/27 709/253 |
| 2004/0054736 A1 | 3/2004 | Daniell et al. |
| 2004/0059711 A1 | 3/2004 | Jandel et al. |
| 2004/0068524 A1 | 4/2004 | Aboulhosn et al. |
| 2004/0070678 A1* | 4/2004 | Toyama .......... H04N 1/00244 707/E17.026 |
| 2004/0088420 A1 | 5/2004 | Allen et al. |
| 2004/0107236 A1 | 6/2004 | Nakagawa et al. |
| 2004/0123048 A1 | 6/2004 | Mullins et al. |
| 2004/0126750 A1 | 7/2004 | Theilmann et al. |
| 2004/0143598 A1 | 7/2004 | Drucker et al. |
| 2004/0148207 A1 | 7/2004 | Smith et al. |
| 2004/0148375 A1 | 7/2004 | Levett et al. |
| 2004/0172423 A1* | 9/2004 | Kaasten .......... G06F 16/1787 |
| 2004/0177319 A1 | 9/2004 | Horn et al. |
| 2004/0267905 A1 | 12/2004 | McDonough et al. |
| 2004/0268364 A1 | 12/2004 | Faraj |
| 2005/0015441 A1 | 1/2005 | Attwood et al. |
| 2005/0038863 A1 | 2/2005 | Onyon et al. |
| 2005/0044164 A1 | 2/2005 | O'Farrell et al. |
| 2005/0044165 A1 | 2/2005 | O'Farrell et al. |
| 2005/0050479 A1 | 3/2005 | Bogdan et al. |
| 2005/0060281 A1 | 3/2005 | Bucher et al. |
| 2005/0091289 A1 | 4/2005 | Shappell et al. |
| 2005/0091595 A1 | 4/2005 | Shappell et al. |
| 2005/0149481 A1 | 7/2005 | Hesselink et al. |
| 2005/0149508 A1 | 7/2005 | Deshpande et al. |
| 2005/0165869 A1 | 7/2005 | Huang et al. |
| 2005/0192008 A1* | 9/2005 | Desai .......... H04L 67/1095 455/435.2 |
| 2005/0193361 A1 | 9/2005 | Vitanov et al. |
| 2005/0198015 A1 | 9/2005 | Sezan et al. |
| 2005/0208803 A1 | 9/2005 | Rohatgi et al. |

(56) References Cited

U.S. PATENT DOCUMENTS

| | | |
|---|---|---|
| 2005/0223061 A1 | 10/2005 | Auerbach et al. |
| 2005/0246373 A1 | 11/2005 | Faulkner et al. |
| 2005/0246374 A1 | 11/2005 | Blinn et al. |
| 2005/0248374 A1 | 11/2005 | Kushnick |
| 2005/0262166 A1 | 11/2005 | Rajeev et al. |
| 2005/0278458 A1 | 12/2005 | Berger et al. |
| 2006/0018444 A1 | 1/2006 | Pantana et al. |
| 2006/0052091 A1 | 3/2006 | Onyon et al. |
| 2006/0053380 A1* | 3/2006 | Spataro .................. G06Q 10/10 709/204 |
| 2006/0069809 A1 | 3/2006 | Serlet |
| 2006/0085429 A1 | 4/2006 | Wener et al. |
| 2006/0101053 A1 | 5/2006 | Proctor et al. |
| 2006/0101064 A1 | 5/2006 | Strong et al. |
| 2006/0123010 A1 | 6/2006 | Landry et al. |
| 2006/0156239 A1 | 7/2006 | Jobs et al. |
| 2006/0168000 A1 | 7/2006 | Bodlaender et al. |
| 2006/0170669 A1 | 8/2006 | Walker et al. |
| 2006/0184673 A1 | 8/2006 | Liebman |
| 2006/0198015 A1 | 9/2006 | Engler et al. |
| 2006/0242206 A1 | 10/2006 | Brezak et al. |
| 2006/0259957 A1 | 11/2006 | Tam et al. |
| 2006/0286536 A1 | 12/2006 | Mohler et al. |
| 2007/0005581 A1 | 1/2007 | Arrouye et al. |
| 2007/0005707 A1 | 1/2007 | Teodosiu et al. |
| 2007/0016586 A1 | 1/2007 | Samji et al. |
| 2007/0016695 A1 | 1/2007 | Rabbers et al. |
| 2007/0043830 A1 | 2/2007 | Housenbold et al. |
| 2007/0078938 A1 | 4/2007 | Hu et al. |
| 2007/0156434 A1 | 7/2007 | Martin et al. |
| 2007/0179989 A1 | 8/2007 | Maes |
| 2007/0180075 A1 | 8/2007 | Chasman et al. |
| 2007/0180084 A1 | 8/2007 | Mohanty et al. |
| 2007/0198473 A1 | 8/2007 | Carrier et al. |
| 2007/0209005 A1 | 9/2007 | Shaver et al. |
| 2007/0239898 A1 | 10/2007 | Friend et al. |
| 2007/0250645 A1 | 10/2007 | Meadows et al. |
| 2007/0276836 A1 | 11/2007 | Chatterjee et al. |
| 2007/0288614 A1 | 12/2007 | May et al. |
| 2007/0294366 A1 | 12/2007 | Ozzie et al. |
| 2008/0109448 A1 | 5/2008 | Aboel-Nil et al. |
| 2008/0126936 A1 | 5/2008 | Williams |
| 2008/0140732 A1 | 6/2008 | Wilson et al. |
| 2008/0168185 A1 | 7/2008 | Robbin et al. |
| 2008/0184125 A1 | 7/2008 | Suleiman et al. |
| 2008/0189627 A1 | 8/2008 | Nikitin et al. |
| 2008/0195729 A1 | 8/2008 | Chand et al. |
| 2008/0195739 A1 | 8/2008 | Ozzie et al. |
| 2008/0208870 A1 | 8/2008 | Tsang |
| 2008/0208998 A1 | 8/2008 | Warren et al. |
| 2008/0222212 A1 | 9/2008 | Prasad et al. |
| 2008/0250083 A1 | 10/2008 | Kovacs et al. |
| 2008/0307504 A1 | 12/2008 | Cisler et al. |
| 2009/0024931 A1 | 1/2009 | Bae |
| 2009/0064284 A1 | 3/2009 | Poston et al. |
| 2009/0094252 A1 | 4/2009 | Wong et al. |
| 2009/0183060 A1 | 7/2009 | Heller et al. |
| 2009/0187609 A1 | 7/2009 | Barton et al. |
| 2009/0192976 A1 | 7/2009 | Spivack et al. |
| 2009/0300020 A1 | 12/2009 | Chen et al. |
| 2009/0327900 A1 | 12/2009 | Noll et al. |
| 2009/0328135 A1 | 12/2009 | Szabo et al. |
| 2010/0063670 A1 | 3/2010 | Brzezinski et al. |
| 2010/0115037 A1 | 5/2010 | Hull et al. |
| 2010/0115614 A1 | 5/2010 | Barile et al. |
| 2010/0153513 A1 | 6/2010 | Zahran |
| 2010/0198871 A1 | 8/2010 | Stiegler et al. |
| 2010/0205196 A1 | 8/2010 | Schreiber et al. |
| 2010/0241980 A1 | 9/2010 | Sosnosky et al. |
| 2010/0332682 A1 | 12/2010 | Sharp et al. |
| 2011/0010332 A1 | 1/2011 | Vasudevan et al. |
| 2011/0106880 A1 | 5/2011 | Strong et al. |
| 2012/0016915 A1 | 1/2012 | Choi et al. |
| 2012/0030378 A1 | 2/2012 | Kaila et al. |
| 2012/0084355 A1 | 4/2012 | Locker et al. |
| 2012/0096389 A1 | 4/2012 | Flam et al. |
| 2012/0102410 A1 | 4/2012 | Gewecke et al. |
| 2012/0127156 A1 | 5/2012 | Goossens et al. |
| 2012/0197862 A1 | 8/2012 | Woytowitz et al. |
| 2012/0330887 A1 | 12/2012 | Young et al. |
| 2013/0007207 A1 | 1/2013 | Dietrich et al. |
| 2013/0066975 A1 | 3/2013 | Kantor et al. |
| 2013/0067594 A1 | 3/2013 | Kantor et al. |
| 2013/0091550 A1 | 4/2013 | Joyce et al. |
| 2013/0110903 A1 | 5/2013 | Myerscough et al. |
| 2013/0117423 A1 | 5/2013 | Gupta et al. |
| 2013/0191451 A1 | 7/2013 | Tse et al. |
| 2013/0198868 A1 | 8/2013 | Georgiev |
| 2013/0205251 A1 | 8/2013 | Cisler et al. |
| 2013/0212486 A1 | 8/2013 | Joshi et al. |
| 2013/0232187 A1 | 9/2013 | Workman et al. |
| 2013/0239014 A1 | 9/2013 | Patil |
| 2013/0246610 A1 | 9/2013 | Hirano |
| 2013/0275509 A1 | 10/2013 | Micucci et al. |
| 2013/0282830 A1 | 10/2013 | Besen et al. |
| 2013/0305039 A1 | 11/2013 | Gauda et al. |
| 2013/0311598 A1 | 11/2013 | Arrouye et al. |
| 2013/0311986 A1 | 11/2013 | Arrouye et al. |
| 2013/0318582 A1 | 11/2013 | McCann et al. |
| 2014/0095457 A1 | 4/2014 | Quan et al. |
| 2014/0181016 A1 | 6/2014 | Whitehead et al. |
| 2014/0188868 A1 | 7/2014 | Hunter et al. |
| 2014/0317031 A1 | 10/2014 | Babenko et al. |
| 2014/0330857 A1 | 11/2014 | Hunter et al. |
| 2015/0193347 A1* | 7/2015 | Kluesing .............. G06F 12/0888 711/137 |
| 2015/0213101 A1 | 7/2015 | Strong et al. |
| 2015/0222580 A1 | 8/2015 | Grue |
| 2015/0264115 A1 | 9/2015 | Reilly et al. |
| 2015/0358406 A1 | 12/2015 | Scheer et al. |
| 2016/0026704 A1 | 1/2016 | Strong et al. |
| 2016/0028809 A1 | 1/2016 | Strong et al. |
| 2016/0028810 A1 | 1/2016 | Strong et al. |
| 2016/0028811 A1 | 1/2016 | Rashid et al. |
| 2016/0028812 A1 | 1/2016 | Strong et al. |
| 2016/0028813 A1 | 1/2016 | Strong et al. |
| 2016/0028814 A1 | 1/2016 | Strong et al. |
| 2016/0028815 A1 | 1/2016 | Strong et al. |
| 2016/0028852 A1 | 1/2016 | Strong et al. |
| 2016/0055171 A1 | 2/2016 | Araki et al. |
| 2017/0017352 A1* | 1/2017 | Kanter .................. G06F 3/0485 |
| 2017/0093780 A1 | 3/2017 | Lieb et al. |
| 2017/0104648 A1* | 4/2017 | Meier ..................... H04L 67/53 |
| 2018/0278684 A1 | 9/2018 | Rashid et al. |
| 2018/0304434 A1* | 10/2018 | Sakugawa ............... B24B 49/08 |
| 2023/0004529 A1 | 1/2023 | Berman et al. |

OTHER PUBLICATIONS

Notice of Allowance from U.S. Appl. No. 14/872,004, dated Apr. 19, 2022, 4 pages.

Advisory Action from U.S. Appl. No. 15/964,267, dated Feb. 18, 2021, 3 pages.

Advisory Action from U.S. Appl. No. 14/873,004, dated May 19, 2020, 3 pages.

Advisory Action from U.S. Appl. No. 15/992,342, dated May 19, 2020, 3 pages.

Deshpande M., et al., "Item-Based Top-N Recommendation Algorithms," ACM Transactions on Information Systems, vol. 22, No. 1, Jan. 2004, pp. 143-177.

Final Office Action from U.S. Appl. No. 14/873,004, dated Feb. 12, 2020, 18 pages.

Final Office Action from U.S. Appl. No. 15/964,267, dated Nov. 19, 2021, 25 pages.

Final Office Action from U.S. Appl. No. 15/964,267, dated Nov. 30, 2020, 27 pages.

Final Office Action from U.S. Appl. No. 15/992,342, dated Feb. 25, 2020, 19 pages.

Final Office Action from U.S. Appl. No. 16/397,945, dated Sep. 29, 2020, 20 pages.

Jmans25, "Map/Mount Dropbox as a Network Drive," Oct. 14, 2011, Youtube, 1 page.

(56) References Cited

OTHER PUBLICATIONS

Non-Final Office Action from U.S. Appl. No. 14/873,187, dated Jan. 10, 2020, 17 pages.
Non-Final Office Action from U.S. Appl. No. 15/964,267, dated Aug. 6, 2021, 26 pages.
Non-Final Office Action from U.S. Appl. No. 15/964,267, dated Jul. 27, 2020, 21 pages.
Non-Final Office Action from U.S. Appl. No. 16/397,945, dated Jul. 23, 2020, 18 pages.
Non-Final Office Action from U.S. Appl. No. 16/508,059, dated Apr. 2, 2021, 14 pages.
Non-Final Office Action from U.S. Appl. No. 16/991,446, dated Jul. 8, 2021, 18 pages.
Notice of Allowance for U.S. Appl. No. 14/873,186 dated May 15, 2019, 32 pages.
Notice of Allowance from U.S. Appl. No. 14/872,004, dated Nov. 10, 2021, 11 pages.
Notice of Allowance from U.S. Appl. No. 14/872,019, dated Feb. 15, 2022, 9 pages.
Notice of Allowance from U.S. Appl. No. 14/872,019, dated Jan. 21, 2022, 15 pages.
Notice of Allowance from U.S. Appl. No. 14/873,004, dated Aug. 12, 2020, 6 pages.
Notice of Allowance from U.S. Appl. No. 14/873,004, dated Jun. 12, 2020, 11 pages.
Notice of Allowance from U.S. Appl. No. 14/873,187, dated Jul. 30, 2020, 8 pages.
Notice of Allowance from U.S. Appl. No. 14/873,187, dated Jun. 24, 2020, 13 pages.
Notice of Allowance from U.S. Appl. No. 15/964,267, dated Feb. 14, 2022, 7 pages.
Notice of Allowance from U.S. Appl. No. 15/992,342, dated Aug. 27, 2020, 5 pages.
Notice of Allowance from U.S. Appl. No. 15/992,342, dated Jun. 15, 2020, 10 pages.
Notice of Allowance from U.S. Appl. No. 16/397,945, dated Feb. 25, 2021, 2 pages.
Notice of Allowance from U.S. Appl. No. 16/397,945, dated Jan. 6, 2021, 11 pages.
Notice of Allowance from U.S. Appl. No. 16/508,059, dated Nov. 5, 2021, 17 pages.
Notice of Allowance from U.S. Appl. No. 16/991,446, dated Oct. 4, 2021, 10 pages.
Notice of Allowance for U.S. Appl. No. 12/157,772 dated Oct. 6, 2010, 15 pages.
Notice of Allowance for U.S. Appl. No. 12/928,998 dated Oct. 9, 2012, 13 pages.
Notice of Allowance for U.S. Appl. No. 13/571,512 dated Apr. 6, 2018, 17 pages.
Notice of Allowance for U.S. Appl. No. 13/757,024 dated Jul. 25, 2013, 11 pages.
Notice of Allowance for U.S. Appl. No. 13/757,024 dated Oct. 30, 2013, 7 pages.
Notice of Allowance for U.S. Appl. No. 14/075,598 dated Jan. 14, 2015, 10 pages.
Notice of Allowance for U.S. Appl. No. 14/683,341 dated Jun. 25, 2018, 10 pages.
Notice of Allowance for U.S. Appl. No. 14/873, 195 dated Apr. 2, 2019, 15 pages.
Notice of Allowance for U.S. Appl. No. 14/873,199 dated Jan. 25, 2019, 16 pages.
Notice of Allowance for U.S. Appl. No. 14/873,197 dated Aug. 29, 2019, 14 pages.
Office Action for U.S. Appl. No. 14/873,187 dated Apr. 24, 2019, 21 pages.
Office Action for U.S. Appl. No. 11/269,498 dated Aug. 22, 2007, 18 pages.
Office Action for U.S. Appl. No. 11/269,498 dated Mar. 25, 2008, 17 pages.
Office Action for U.S. Appl. No. 11/269,498 dated Mar. 7, 2007, 14 pages.
Office Action for U.S. Appl. No. 12/928,998 dated Apr. 22, 2011, 26 pages.
Office Action for U.S. Appl. No. 12/928,998 dated Nov. 23, 2011, 24 pages.
Office Action for U.S. Appl. No. 13/571,512 dated Apr. 23, 2015, 23 pages.
Office Action for U.S. Appl. No. 13/571,512 dated Feb. 24, 2014, 17 pages.
Office Action for U.S. Appl. No. 13/571,512 dated Jun. 13, 2014, 22 pages.
Office Action for U.S. Appl. No. 13/571,512 dated May 19, 2016, 21 pages.
Office Action for U.S. Appl. No. 13/571,512 dated Oct. 20, 2016, 27 pages.
Office Action for U.S. Appl. No. 13/571,512 dated Oct. 26, 2017, 28 pages.
Office Action for U.S. Appl. No. 13/571,512 dated Sep. 23, 2014, 25 pages.
Office Action for U.S. Appl. No. 14/683,341 dated Nov. 16, 2017, 14 pages.
Office Action for U.S. Appl. No. 14/872,004 dated Jan. 18, 2018, 8 pages.
Office Action for U.S. Appl. No. 14/872,004 dated Mar. 28, 2019, 19 pages. .
Office Action for U.S. Appl. No. 14/872,004 dated Sep. 6, 2018, 11 pages.
Office Action for U.S. Appl. No. 14/872,019 dated Aug. 14, 2019, 14 pages.
Office Action for U.S. Appl. No. 14/872,019 dated Aug. 29, 2018, 13 pages.
Office Action for U.S. Appl. No. 14/872,019 dated Feb. 26, 2019, 15 pages.
Office Action for U.S. Appl. No. 14/872,019 dated Nov. 16, 2017, 14 pages.
Office Action for U.S. Appl. No. 14/872,943 dated Jul. 11, 2018, 12 pages.
Office Action for U.S. Appl. No. 14/872,943 dated Oct. 4, 2017, 13 pages.
Office Action for U.S. Appl. No. 14/872,943 dated Dec. 19, 2018, 19 pages.
Office Action for U.S. Appl. No. 14/873,004 dated Aug. 10, 2018, 19 pages.
Office Action for U.S. Appl. No. 14/873,004 dated Feb. 9, 2018, 28 pages.
Office Action for U.S. Appl. No. 14/873,004 dated Jul. 17, 2019, 17 pages.
Office Action for U.S. Appl. No. 14/873,004 dated Nov. 23, 2018, 34 pages.
Office Action for U.S. Appl. No. 14/873,004 dated Oct. 26, 2017, 26 pages.
Office Action for U.S. Appl. No. 14/873,186 dated Mar. 22, 2018, 24 pages.
Office Action for U.S. Appl. No. 14/873,186 dated Dec. 13, 2018, 33 pages.
Office Action for U.S. Appl. No. 14/873,187 dated Apr. 17, 2018, 15 pages.
Office Action for U.S. Appl. No. 14/873,187 dated Dec. 10, 2018, 18 pages.
Office Action for U.S. Appl. No. 14/873,195 dated Apr. 19, 2018, 14 pages.
Office Action for U.S. Appl. No. 14/873,195 dated Oct. 26, 2018, 14 pages.
Office Action for U.S. Appl. No. 14/873,197 dated Jul. 11, 2018, 13 pages.
Office Action for U.S. Appl. No. 14/873,197 dated Jun. 3, 2019, 20 pages.
Office Action for U.S. Appl. No. 14/873,197 dated Oct. 5, 2017, 13 pages.
Office Action for U.S. Appl. No. 14/873,197 dated Dec. 14, 2018, 16 pages.

(56) References Cited

OTHER PUBLICATIONS

Office Action for U.S. Appl. No. 14/873,199 dated Jun. 1, 2018, 16 pages.
Office Action for U.S. Appl. No. 15/992,342 dated Jul. 31, 2019, 29 pages.
Office Action for U.S. Appl. No. 14/872,943 dated Jun. 17, 2019, 19 pages.
Rhee E., "How to Map a Drive Letter to Google Drive in Windows," May 3, 2012, Retrieved from https://www.cnet.com/how-to/how-to-Map-a-Drive-Letter-to-Google-Drive-in-Windows/ on Oct. 7, 2016, pp. 1-2.
Srinet K., et al., "10-605—HW 5—Distributed SGD for Matrix Factorization on Spark," Carnegie Mellon University, Pittsburgh, PA, Nov. 12, 2015, pp. 1-11.
Final Office Action from U.S. Appl. No. 17/663,628, dated Mar. 31, 2023, 31 pages.
Non-Final Office Action from U.S. Appl. No. 17/663,628, dated Oct. 26, 2022, 29 pages.
Non-Final Office Action from U.S. Appl. No. 17/580,519, dated May 16, 2023, 17 pages.

\* cited by examiner

Photo Sharing:

- Share
  - Client app that allows PC-to-PC sharing of high-resolution pictures
  - Buddy lists and album group management
  - Videos and slideshows

- Synchronize
  - Changes to albums synchronized automatically across all devices
  - Collaborative annotation of pictures

- Access
  - Fast, easy access to high-resolution images on your computer
  - Access thru a website that mirrors the view from your desktop

- Backup
  - Server backup of shared pictures and application settings
  - Easy restoration of app settings, preferences and data on any PC

*FIG. 4*

METHOD AND APPARATUS FOR A FILE SHARING AND SYNCHRONIZATION SYSTEM

CROSS-REFERENCE TO RELATED APPLICATIONS

This application is a continuation of U.S. patent application Ser. No. 14/872,004, filed on Sep. 30, 2015, which is a continuation of U.S. patent application Ser. No. 14/075,598, filed on Nov. 8, 2013, which issued as U.S. Pat. No. 9,037,540, which is a continuation of U.S. patent application Ser. No. 13/757,024, filed on Feb. 1, 2013, which issued as U.S. Pat. No. 8,600,934, which is a continuation of U.S. patent application Ser. No. 12/928,998, filed on Dec. 23, 2010, which issued as U.S. Pat. No. 8,370,298, which is a continuation of U.S. patent application Ser. No. 12/157,772, filed on Jun. 13, 2008, which issued as U.S. Pat. No. 7,885,925, which is a continuation of application Ser. No. 11/269,498, filed on Nov. 8, 2005, which claims the benefit of and priority to U.S. Provisional Patent Application No. 60/626,121, filed on Nov. 8, 2004. Each of the aforementioned applications is hereby incorporated by reference in its entirety.

TECHNICAL FIELD

The field of the invention generally relates to data management, and more specifically, to methods of synchronizing data used in personal information managers or other programs, especially when the file or data is used or shared among multiple computing devices.

BACKGROUND

File sharing and data management, in general, is a problem today. With all of the various types of files on different devices such as personal computers, personal digital assistants, or cellular phones, the management of data in an efficient manner from device-to-device is a challenge for users.

In the context of data files in general, files worked on at one location by a user may not be accessible from a device at another location. For example, a user working at home may have files left there on a home computer that are not accessible from a computer at work. Data on one device may be lost because the user failed to regularly back-up the data files on the device. In other situations, short of forwarding each file or email to another account, switching accounts at an internet service providers may cause a user to lose their emails and other personal files resident on that ISPs server. All of these problems with data portability, management, and access create inefficiencies for a user.

Some known systems have tried to address these issues. In the photo sharing context, websites such as Ofoto have allowed users to load files to the Ofoto website to share among multiple devices and multiple users. This does allow some access to images when the user is not at his/her home computer and to share photos with users at remote locations. The sharing of files, however, among multiple users is typically limited to low-resolution versions of the original images, and this sharing of lower quality files may cause a user difficulty in viewing the image. Additionally, there is no data persistence as the files on the server may be deleted after a certain period of inactivity. In systems where users use peer-to-peer sharing or email picture files to each other, images may be lost or hard to track down because the original email was lost or poorly organized among the users files. Additionally, dynamic updating of shared files is not present. The data or file is copied one time and is then static on the sharee's system.

SUMMARY

The present invention provides solutions for at least some of the drawbacks discussed above. Specifically, some embodiments of the present invention provide a repository for a database of files shared in-sync, in real-time across multiple computers or computing devices. Embodiments of the present invention may provide an improved desktop or client application which offers easy sharing of files, automatic synchronization, file access from anywhere, and transparent backup. The present invention desires to be user centric (instead of computer or desktop centric) in the sense that the user can access the user's data regardless of which physical computer or device the user is using. At least some of these and other objectives described herein will be met by embodiments of the present invention.

In one embodiment of the present invention, an improved data management system is provided. The system may comprise a server platform that enables synchronization, back-up, web access, and sharing of applications and data. This allows for a user's data to be accessible from any pc or web browser. Changes to files, email, and/or calendar entries may be synchronized automatically across a user's computers. The shared files will be updated including but not limited to new metadata, improvements to the files, or the like. The system may be configured for transparent backup to a central server. Such systems give the user an ability to reproduce applications with the user's settings and data on any computer with "one click".

In another embodiment of the present invention, a native suite of client applications may be provided that allows for management and access of all the user's data locally on the user's hard drive. The client applications may be downloaded to reside on a user's computer and provide access to a server platform that functions to synchronize files across multiple computing devices and allows for backup of the user's files. The client applications may allow for management of personal email, photo files, video files, personal calendar entries or the like. A rich user interface is provided to make file access and management fast and easy. The client applications take the thinking out of data management and back-up by making it automatic and transparent.

In another embodiment of the present invention, a synchronization engine is provided that allows users to synchronize metadata on files on the system. By way of example and not limitation, this is particularly useful in the sharing of electronic photos where collaborative tagging of files by different users may be enabled by the invention to more accurately organize and search for picture files. The updating and synchronizing of metadata allows all users to benefit from more detailed metadata that may be provided by one user, which is then cascaded or pushed to picture files resident on other computers of other users that share the file.

In one aspect, the present invention allows for the persistence of data. The user can change computers, emails accounts, but the emails, photos, or other user files may persist and can be downloaded to the user's system at different computer terminals or portable devices. These applications may be accessed through a web application if the user is on a public terminal or if the user is at a computer they do not own. The client may be also be downloaded to the computer. The present invention provides real-time, synchronized storage of a users files at a central server. This creates a backup for the user and no longer ties the user to any one particular physical device, so long as the user has access to the server.

A further understanding of the nature and advantages of the invention will become apparent by reference to the remaining portions of the specification and drawings.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 4 illustrates a block diagram of an exemplary photo sharing application, according to one embodiment of the present invention;

DETAILED DESCRIPTION

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a processor" may include may include multiple processors, and the like. References cited herein are hereby incorporated by reference in their entirety, except to the extent that they conflict with teachings explicitly set forth in this specification.

A "server" in a hardware configuration may be a computer such as a personal computer (PC) or other intelligent device. A server typically performs the bulk of the centralized or generalized tasks in the network and often has more memory, processing speed, and storage than the other device on the client-server network. Alternatively, the server may perform specialized tasks such as distributing electronic mail, data storage or printing. In the software arrangement, a "server" typically is a program that provides data, stores data, or provides some service to other programs to lo which the server is connected. A server may be a program with higher priority, greater memory, or greater capabilities compared to the other programs connected through the network. A server also may be a program that includes specialized capabilities or has higher priority with respect to certain tasks or functions.

A "client" in the software arrangement is generally a program used by a user. A client program typically makes use of data, processing, storage, or other resources of another program. A client may be used to communicate with a source or destination through a higher priority, more powerful, more capable or different program. The client may run on a computer such as a personal computer (PC), intelligent device, personal digital assistant (PDA) or workstation used by a user. In use, the client may carryout tasks in the process of which the client may request information or otherwise may use the resources of another object such as the server or another client to accomplish such tasks.

Synchronization

Figure 1:
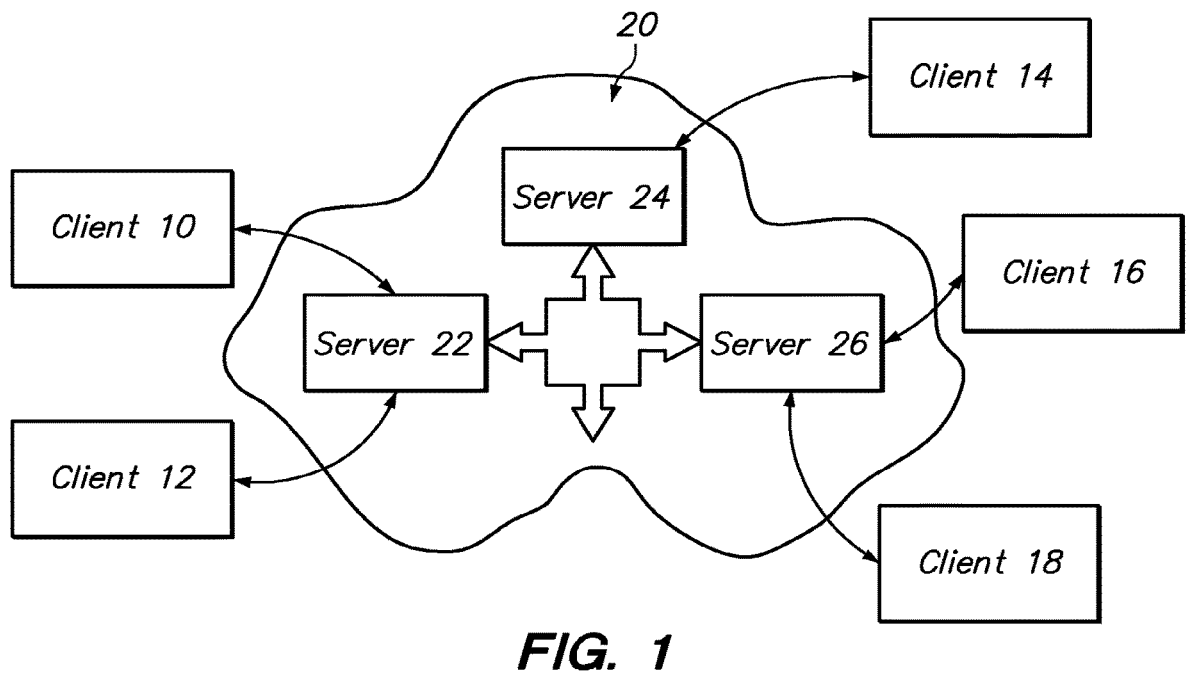
FIG. 1 illustrates a block diagram of an exemplary client server architecture, according to one embodiment of the present invention.
Figure 2:
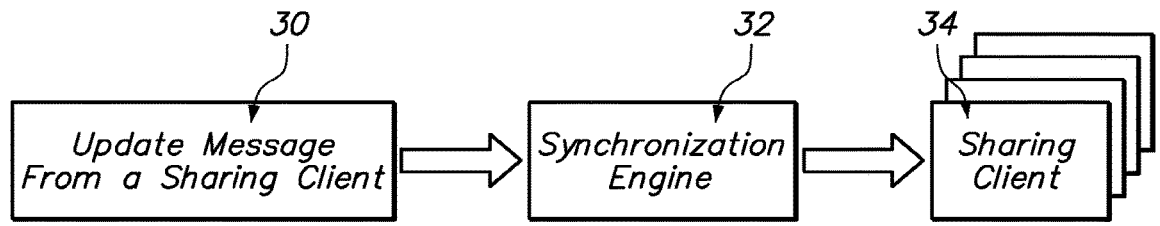
FIG. 2 illustrates a block diagram of an exemplary process for synchronizing a data object amongst the clients, according to one embodiment of the present invention.

Referring now to FIGS. 1 and 2, one embodiment of a system for sharing files among multiple computing devices will now be described. One of the components of the present invention is that if a user has multiple computers, the data is kept in-sync and in real-time across all of the users computers connected to a network. If the user makes a change on one computer to the database or a file, the change is synchronized to the server and synchronized in real-time to the user's other computers. This means that changes made on one computer are kept up-to-date on the server. The user can sit down at any of the user's other computers (or at a set of computers defined by the user) and pick-up where the user left off. The user can also log onto to a website and using a web application, pick-up where the user left off. This allows the user's files to be accessed from any number of different workspaces. Additionally, it should be understood that clients that run on mobile devices may be used to access the user's files.

FIG. 1 shows how computers or devices running clients 10, 12, 14, 16, and 18 may be coupled to each other via servers. FIG. 1 is a logical diagram of various clients communicating through a server platform. Client 10 and client 12 are able to hook into the wide area network 20 by means of logically connecting to a server 22. The wide area network 20 could be the Internet or an intranet or any other such wide area network or even a local area network. In like manner, client 14 has access to the wide area network 20 through server 24 and client 16 and client 18 have access through server 26. Although multiple servers are shown for this example, it should be understood that some embodiments may use only one server for the server platform to connect all sharing clients together.

The respective servers 22, 24, and 26 can communicate with one another directly or indirectly. The actual clients may not have the capability to communicate with any other entity besides the respective server to which they are connected but through the wide area network and the ability of the servers to communicate.

The net effect of such an arrangement allows any client to communicate with any other client through the transport connection between servers. This allows each client, regardless of the server to which it is connected, the ability to send messages to each other client over the wide area network 20. In this manner, clients may be given the ability to control replication as will be shown hereafter without regard to the type of server to which they may be connected or the client's ability to directly communicate with another client. By way of example and not limitation, the servers 22, 24, and 26 may form a server platform and at least one of the servers may run a synchronization engine for distributing updates among different clients.

FIG. 2 is a schematic depicting the basic paradigm for synchronizing a data object amongst the clients. Referring to FIG. 2, changes or updates 30 from a sharing client 34 will be sent to the synchronization engine 32 which will forward or update a copy of a data object on each of the clients listed as part of the plurality of sharing clients 34 in order to synchronize that data object with other sharing clients. Each client preferably has the ability to communicate with a server and have the appropriate software running thereon. The sharing client 34 may operate to synchronize a local database on the local computer with a remote database, such as a server database on a datastore 40 in FIG. 3 that may be maintained on one server or a server farm. In this example, the server or server farm may be coupled to the network, and receive and transmit communications via a firewall, provided by a server farm provider, that implements well-know security features.

There are a variety of ways to notify the sharing clients 34 that a change has been made. In one embodiment of the present invention, if changes are made by one of the sharing clients 34 to a particular data object, an update message 30 is sent from the particular sharing client to the synchronization engine 32. The synchronization engine, in turn, will make the particular adjustment to the original or copy of the data object on the server and distribute the data object out to each of the sharing clients 34. The update message 30 may include instructions, such as a delete command to remove a particular data object or a modify command for modifying a particular data object. One way of representing a modification to an existing data object or the creation of a new data object is to include the actual data object in its modified form. Thus in some embodiments, updates are represented by sending a new copy of the entire object.

This two way synchronization may occur in real-time which, for example and not limitation, may occur with the files being updated whenever an autosave occurs to the data or file being edited. The autosaved version may be updated to the server having the synchronization engine and then pushed out or cascaded to the sharing clients. Some sharing clients may be configured to accept updates to files that are not currently being edited on at the local client, to prevent any conflicts. In some embodiments, the user may be prompted that there has been an update on a file they are editing locally and may accept or reject the changes. For changes to metadata, some embodiments of the present invention may allow simultaneous edits and merge them without notifying the user. If two users are editing separate fields, both changes will persist. If both users modify the same field, one of the changes will be silently discarded. For files, the user will be prompted to choose which version to keep.

Figure 3:
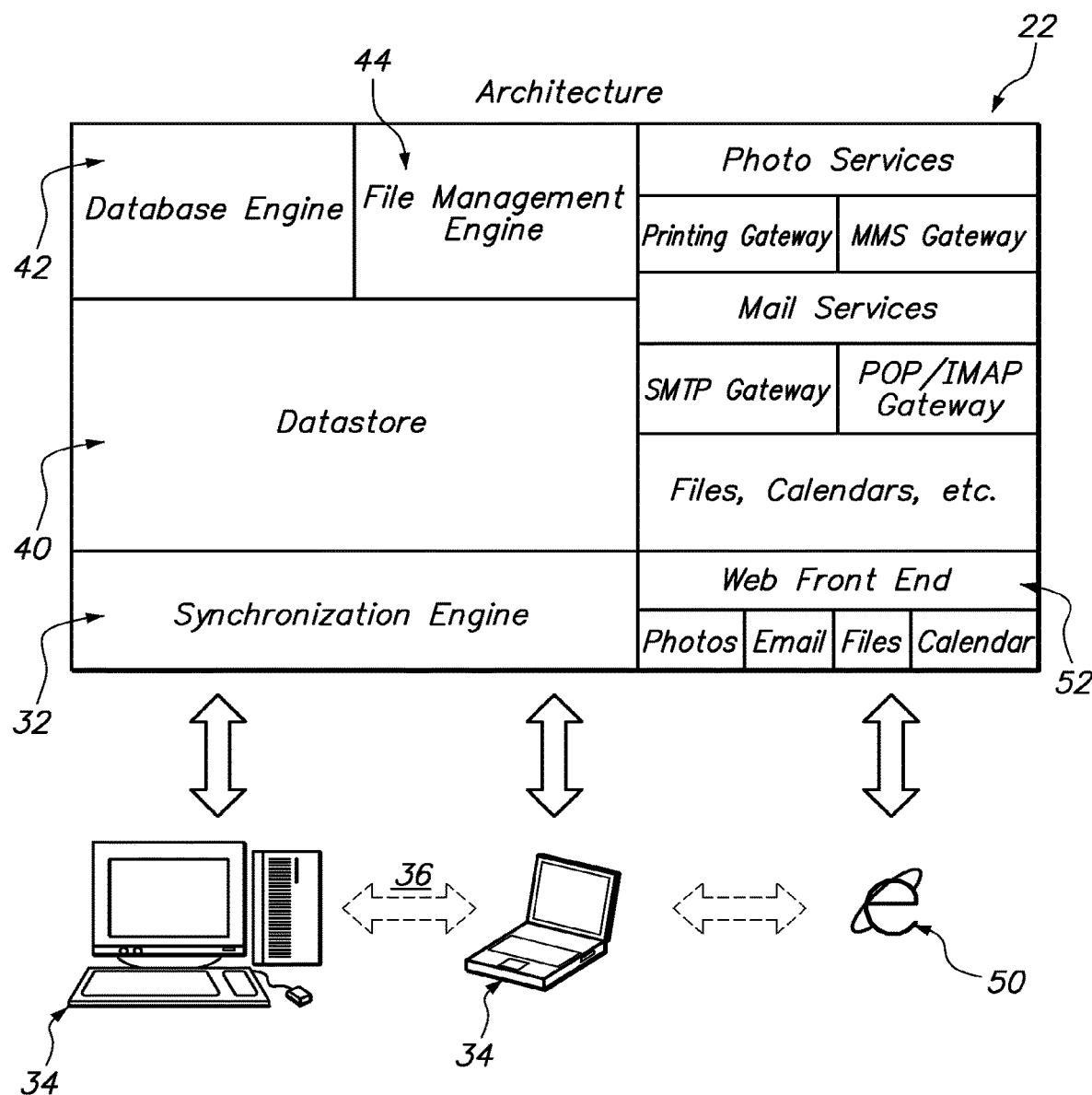
FIG. 3 illustrates a block diagram of an exemplary architecture of a server platform, according to one embodiment of the present invention.

Referring now to FIG. 3, a schematic showing the architecture of a server platform according to the present invention will now be described. In this embodiment, the server platform may be at least one server 22 which has a synchronization engine 32 which communicates with sharing clients 34 running on devices which may be but are not limited to desktop computers and laptop computers. This allows updates received by the server to be updated to the sharing clients 34. The sharing clients 34 may also communicate with each other as indicated by arrow 36.

As seen in FIG. 3, the server 22 may include a datastore 40 that holds complete copies of the user files being shared. In a picture sharing environment, full resolution and complete copies of those files are also resident on the local computers of each sharing client 34. In other words, complete copies of files exist at the server level and at the local level for each of the computers or devices sharing the files. A database engine 42 and file management engine 44 may also be used to organize and access the files in the datastore 40.

FIG. 3 also shows that instead of using a sharing client 34, a web browser 50 may also be used to access the user files resident in the datastore 40 of the server 22. Although a web browser such as Microsoft Internet Explorer is shown in FIG. 3, it should be understood that a variety of other browsers such as Netscape, WAP browsers, or the like may also be used. In one embodiment of the present invention, the server 22 may include a web front end 52 that allows a user to access files such as shared photo files, email, data files, and/or calendar files. The web front end 52 may be a website or web application that allows the user to access the datastore 40 for picture files, calendars, and/or data files. In this embodiment, mail services and photo services may also be available through the web front end 52 through mail gateways on the server (SMTP and POP/IMAP for sending and receiving email) and photo gateways (printing gateways or MMS gateways for handling media files). Again, files in datastore 40 are again pushed out to other sharing clients 34 so that the most recent versions are available to the users of the shared files.

Although files may be accessed through the web interface and are not limited to the following, the primary method of accessing information is through a native client on the user's local hard drive or computing device. The files being accessed are accessed from the user's local hard drive. This also allows the user to access files while offline. When connections are continuously available, the files are continuously synchronized. When a continuous connection is not available, then the next time the user is connected, the changes will be synchronized.

In one embodiment, the sharing client 34 may have two modes of operation namely (1) an off-line mode wherein the client machine is not connected to the network and (2) an on-line mode wherein the client machine is connected to the network. In the off-line mode, the sharing client 34 performs only local operations. When operating in the on-line mode, the client 34 will be configured to receive real-time updates with the synchronization engine 32 to perform global synchronization operations.

When communications are first established between the server 22 and the desktop computer, there are potentially a number of modified, unsynchronized objects on the two computers. Again there may be variety of ways to determine which files need updating. Synchronization may be based on the time of the last update or may be based on some other criteria set by the user. For example and not limitation, the system may utilize an appropriate sequence number scheme employed by the local database on a sharing client 34. Specifically, a sequence number may be communicated of the last activity with respect to the local database of which the server database was aware. The synchronization engine 32 will then communicate records for all activity occurrences that have sequence numbers greater than the sequence number communicated. Other embodiments may have the synchronization engine maintain a log of changes. The log is provided to sharing client 34 when communications are established. The log indicates object identifiers for the objects that have been modified, added, or deleted in the server's datastore.

In some cases, an object will have changed in both the server and the local device. If so, the user is prompted to resolve the conflict by deciding which modification should be retained. In one embodiment of the invention, the server instance of the object is received by sharing client 34 from a synchronization engine and used to create a new object in desktop object store. The sharing client 34 may prompt a user to decide which of the two objects (server or client) should be retained. If the server version of the object is selected, it replaces the desktop version. If the desktop version is selected, it is sent to the server synchronization engine to overwrite the existing version of the object in server object store.

FIG. 4 describes the application of the present embodiment of the system to a photo sharing application. In this application, the application of the sharing client 34 allows PC-to-PC sharing of high-resolution pictures. The full resolution copies of the pictures are resident on the computers running the sharing client 34 and also on the datastore 40 on the server 22 of the server platform. The sharing client 34 may include buddy lists and album group management to organize the files being shared. In addition to picture files, other files such as but not limited to videos and slideshows may also be shared.

When a user with a sharing client 34 makes changes to albums or files on a local computer, the changes are synchronized automatically across all devices. The saved changes are sent from one sharing client 34 to the synchronization engine 32 on the server 122. The synchronization engine 32 will have the datastore 40 updated with the latest file and also transmit this latest version to other sharing clients 34 that are designated as sharing with the sharing client 34 that originated the changes. Changes are synchronized even when annotation or metadata is updated for a file. This allows for collaborative annotation of pictures or other files.

The present invention allows fast, easy access to high-resolution images on the computer of each user sharing the files. Access is also available through a website that mirrors the view from the user desktop. Furthermore, since full resolution copies of files are resident in the datastore 40 of the server 22, server backup of shared pictures and application settings occur automatically. This allows for easy restoration of application settings, preferences and data on any PC.

Two-Level Sharing

Figure 5:
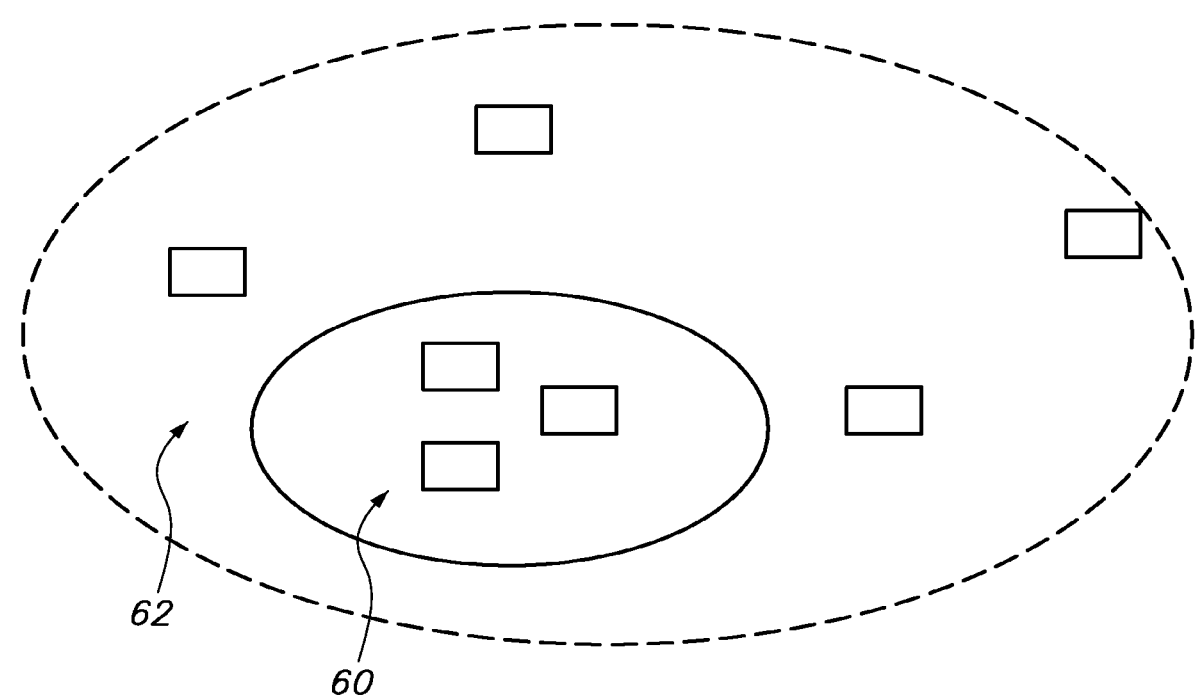
FIG. 5 illustrates a block diagram of an exemplary synchronization architecture, according to one embodiment of the present invention.

Referring now to FIG. 5, in one aspect of synchronization, some embodiments of the present invention control the release of updates to computers outside of a defined subset 60 of computers. The present invention may provide a multi-phase commit process for shared files and data objects where changes are visible only to a single user or group of users until they are published to a wider audience 62. By way of example and not limitation, updates the user makes to a file may be reflected on the user's own computers, but not on any of the other computers (outside the subset) where the user has shared the file until the user publishes the changes. It is a two-step file save process. The draft change may also be released to a subset of users who are sharing the document.

For example, an application may automatically save changes to a document as a user edits it. These changes will be saved to the datastore and synchronized to other computers belonging to the user who made the changes. They will not be visible to other users until the owner chooses to publish them. This could be a multi-phase process where the changes are first published to a group which is a subset of all users who have access to the data object before being published to a wider audience. This is analogous to a two phase commit in a transactional database with a few important distinctions. In a traditional database, the changed record is locked (inaccessible to other users) until the transaction is committed and uncommitted changes are only visible within a single session. In this model, the original object is not locked, and the changes are stored in the database and are accessible to other sessions.

In one embodiment of the present invention, when a user first accesses a repository in the datastore, a separate logical branch is created. This branch is accessible to the user from any computer. In the beginning, this branch is empty, and all accesses are passed through to the original repository. As the user edits objects in the repository, the revisions are stored in the branch, and accesses to modified objects will incorporate these revisions. When the user publishes his changes, the modified records in the branch will be integrated with the main repository, where they will be available to other users. It is possible to create multiple levels of branches, some of which may be shared with other users, allowing the sharing of draft changes with a group of users before they are committed. The user does not need to understand the concept of a branch, only the concept of publishing changes.

For instance, in the photo sharing case, the user can modify a picture with red eye reduction, after the user has already shared the original file with a plurality of people. Immediately, those changes will be synchronized across all of the user's multiple computers or device, but not with the previous shares. Once the user is completely done editing the picture, the server can publish the changes to all his/her shares. It should be understood of course that additional layers of sharing may be implemented to more precisely control the level of access to any particular files. Some embodiments may have multiple layers of sharing.

File Restoration

Embodiments of the present invention may also provide a method for installing applications in which all of a user's settings and data are automatically restored. An application utilizing the platform of the present invention will automatically synchronize all of its settings and data to at least one server. When a user installs an application that he has previously used on another system, all settings and data are automatically restored to their most recent state as part of the install process. In the photo sharing instance, what this means is if a user suffers a hard drive crash or other catastrophic loss of data, the user can automatically reinstall the application and all the data, including buddy lists, album structures, preferences, etc., without having to manually recreate it. If the system was configured to share these files, then the system will have a copy of the files on datastore 40.

Thus data is restored as it was, the last time the user used it. All of the preferences, applications, and data are the same as the last time the user used it. A user would start the installer and would not need to reconfigure the computer to have the preferences and settings from the last use.

Collaborative Metatagging

The present invention also allows for improved metatagging. Tagging is painful and sometimes too much of a burden for a single user. Any updates or tagging will then be synchronized. The sharing experience becomes much richer when the files can be more accurately sorted through metadata. The collaborative tagging improves organizing of pictures. For example and not limitation, all the pictures that a user likes can be sorted and will then be on the user local drive.

The present invention provides a method for allowing photo metadata to be collaboratively created and edited. When a user shares a photo album with others, the user may choose to grant the recipients permission to update metadata relating to the photos in the album (e.g., location and people or objects in the pictures). In the present embodiment, these changes will be propagated to all recipients of the album, allowing them to search on the metadata. So, if one user is not organized enough to enter captions or people for the metadata for that file, if the user shares the album with a plurality of other people, changes entered by any of those people will be propagated to everyone sharing the files, thus enhancing everyone's viewing experience.

Email Aggregation and Synchronization

Figure 6:
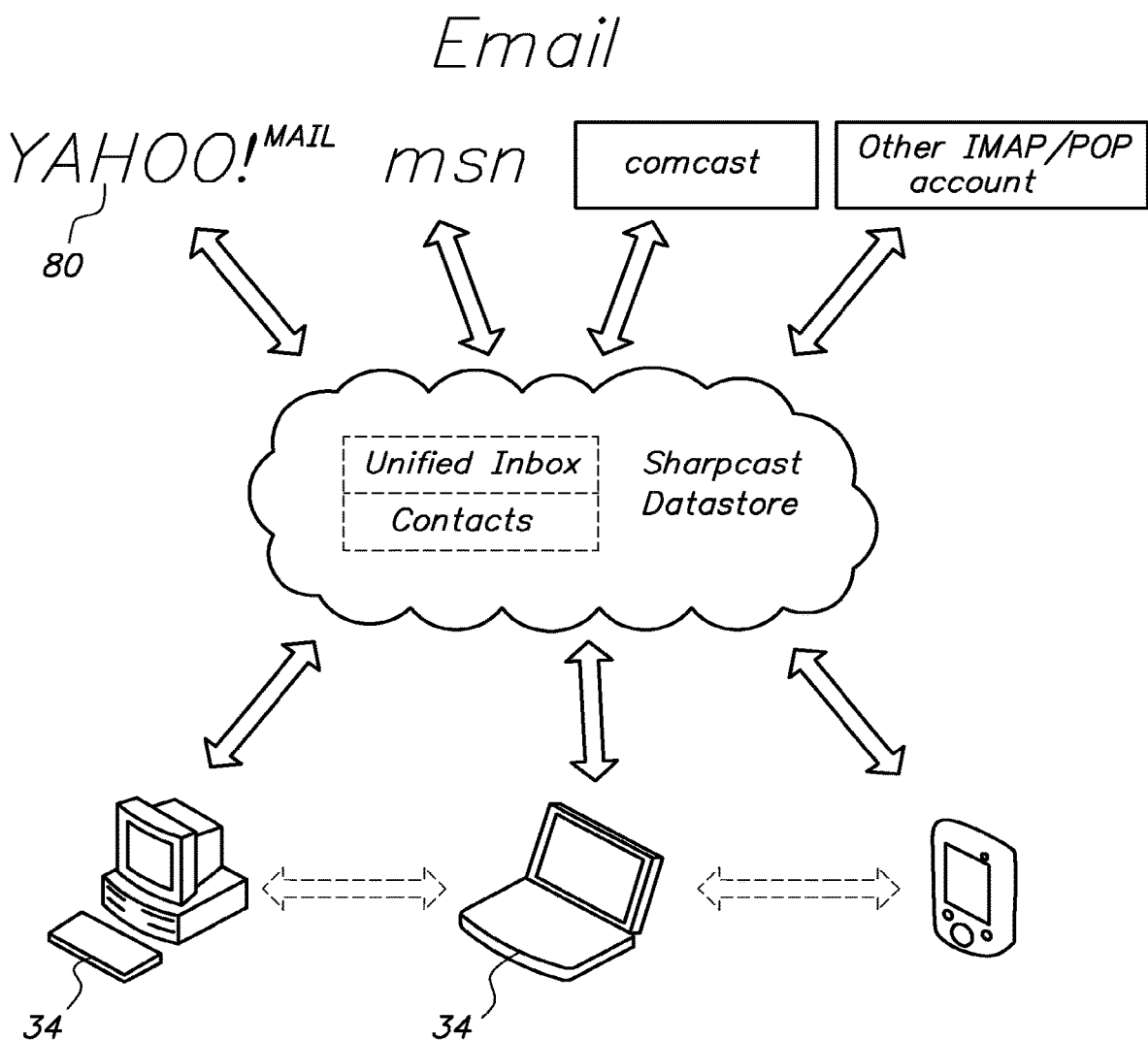
FIG. 6 illustrates a block diagram of an exemplary method is provided for aggregating messages from multiple email accounts into a single virtual account which is synchronized across multiple computers and devices, according to one embodiment of the present invention.

Referring now to FIG. 6, in another aspect of the present invention, a method is provided for aggregating messages from multiple email accounts into a single virtual account which is synchronized across multiple computers and devices. This will provide a non-browser method to access personal email. In one embodiment of the invention, the server 22 checks all of a user's personal email accounts 80 and imports the messages into the datastore 40. The messages are synchronized to all of the user's computers and devices, as are any further changes to the mailstore (e.g. deletions, flags, filing to a folder). The present invention gives customers a virtual Microsoft Exchange experience for their personal email. The layer of abstraction provided by the present invention will give customers freedom from worrying about checking multiple different email accounts through a browser, and instead have access to one inbox, with one set of contacts, etc., that is replicated across all of the user's computers and a server to allow the user to access from anywhere. So, if the user deletes an email message on one computer, or adds a contact to the client in one computer, the change is immediately propagated to all the other computers.

For the present invention, the email integration is based on: 1) aggregation of multiple personal email accounts (all from a central place and all on a central account) and 2) centralization on the server to allow a user to access from multiple computers with the same inbox and contact list. If an email is moved on one server, it moves it in all inboxes. This occurs for personal email aggregated from POP, IMAP accounts, etc). Files are synchronized by the server 22 to all other clients which may access the integrated email. Thus, the present embodiments build a synchronization engine and layer the email client application on top of the synchronization engine. The datastore integrates with the synchronization engine to send updated files to the sharing clients.

Thus, the server 22 in this embodiment also handles aggregation of emails from multiple accounts. The client runs on the local computer and accesses the server with the datastore. The synchronization and aggregation occurs at the server. As mentioned, this system is for the personal email accounts. Multiple personal email accounts are checked through multiple browsers or multiple sessions. In the user's local client, the emails are aggregated. This creates some email portability. All the emails are on the local server and not just on the server of the email service. The present invention provides real-time synchronization among multiple devices and provides aggregation of multiple personal email accounts. The synchronization keeps the connection open at all times so that update changes will be reflected on the new computers.

In one embodiment of the invention, the mailstore will receive email from the personal email accounts for integration and storage on a datastore 40 on server 22. Files on those personal email accounts may then be deleted to reflect changes made in the mailstore. For example and not limitation, spam email that a user deletes from the files on the mailstore will also be deleted from the individual personal accounts so that they are not present if the user accesses the personal accounts directly. Most of these personal accounts are web-based, browser-based accounts. Updates that the user makes to mailstore on the server 22 will be reflected back to those email services. Changes may be reflected back to the originating service via POP, IMAP, or another protocol such as but not limited to Web-DAV.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, with any of the above embodiments, the synchronization engine may synchronize with a personal information module (PIM) (such as but not limited to Microsoft Outlook or the Palm Desktop) or with a Personal Digital Assistant (PDA) (such as but not limited to a Palm device or any Windows CE device). In a further alternative, the present invention may also be used to update a user's personal calendar. This may be a calendar that is separate from the one the user may have at work. Additionally, the integrated email, calendar, and other applications may form a suite of applications where there is one interface accessed by the user that synchronizes multiple sources (emails, photos, and calendars). This will be a way to synchronize all personal data.

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. All publications mentioned herein are incorporated herein by reference to disclose and describe the structures and/or methods in connection with which the publications are cited.

Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A method comprising:
   receiving, by a content management system and from a first client device associated with a first user account, an indication that the first client device is accessing a file that the content management system stores and synchronizes between the first client device and a second client device associated with a second user account;
   detecting, by the content management system and while the first client device is accessing the file, an update to the file based on information received from the second client device associated with the second user account; and providing, for display on the first client device while the first client device is accessing the file, a prompt indicating the update to the file based on detecting the update to the file.

2. The method of claim 1, wherein the file that the first client device accesses is a local copy of the file on the first client device.

3. The method of claim 1, wherein detecting the update to the file based on the information received from the second client device comprises detecting edits to the file applied by the second user account on the second client device.

4. The method of claim 3, wherein providing, to the first client device while the first user account is accessing the file, a prompt indicating the update to the file comprises providing an option with respect to the edits to the file applied by the second user account on the second client device.

5. The method of claim 4, wherein the option with respect to the edits comprises an option to accept the edits to the file.

6. The method of claim 5, further comprising:
receiving, from the first client device, an indication that the first user account selected the option to accept the edits to the file; and
providing, to the first client device, an updated version of the file that includes the edits to the file applied by the second client device.

7. The method of claim 4, wherein the option with respect to the edits comprises an option to reject the edits to the file.

8. The method of claim 1, wherein providing the prompt indicating the update to the file comprises providing the prompt to prevent conflicts for the file.

9. A non-transitory computer readable storage medium comprising instructions that, when executed by at least one processor, cause a computing device to:
receive, by a content management system and from a first client device associated with a first user account, an indication that the first client device is accessing a file that the content management system stores and synchronizes between the first client device and a second client device associated with a second user account;
detect, by the content management system and while the first client device is accessing the file, an update to the file based on information received from the second client device associated with the second user account; and
provide, for display on the first client device while the first client device is accessing the file, a prompt indicating the update to the file.

10. The non-transitory computer readable storage medium of claim 9, wherein providing the prompt indicating the update to the file comprises indicating the prompt to prevent conflicts for the file.

11. The non-transitory computer readable storage medium of claim 9, wherein detecting the update to the file based on the information received from the second client device comprises detecting that the second user account is accessing the file on the second client device.

12. The non-transitory computer readable storage medium of claim 9, wherein detecting the update to the file based on the information received from the second client device comprises detecting edits to the file applied by the second user account on the second client device.

13. The non-transitory computer readable storage medium of claim 12, wherein providing, to the first client device while the first user account is accessing the file, a prompt indicating the update to the file comprises providing an option with respect to the edits to the file applied by the second user account on the second client device.

14. The non-transitory computer readable storage medium of claim 13, wherein the option with respect to the edits comprises an option to accept the edits to the file.

15. The non-transitory computer readable storage medium of claim 14, further comprising instructions that, when executed by the at least one processor, cause the computing device to:
receive, from the first client device, an indication that the first user account selected the option to accept the edits to the file; and
provide, to the first client device, an updated version of the file that includes the edits to the file applied by the second user account on the second client device.

16. A system, comprising:
at least one processor; and
a non-transitory computer readable storage medium comprising instructions that, when executed by the at least one processor, cause the system to:
receive, by a content management system and from a first client device associated with a first user account, an indication that the first client device is accessing a file that the content management system stores and synchronizes between the first client device and a second client device associated with a second user account;
detect, by the content management system and while the first client device is accessing the file, an update to the file based on information received from the second client device associated with the second user account; and
provide, for display on the first client device while the first client device is accessing the file, a prompt indicating the update to the file.

17. The system of claim 16, wherein detecting the update to the file based on the information received from the second client device comprises detecting that the second user account is accessing the file on the second client device.

18. The system of claim 16, wherein detecting the update to the file based on the information received from the second client device comprises detecting edits to the file applied by the second user account on the second client device.

19. The system of claim 18, wherein providing, to the first client device, the prompt indicating the update to the file comprises providing an option to accept the edits to the file.

20. The system of claim 19, further comprising instructions that, when executed by the at least one processor, cause the system to:
receive, from the first client device, an indication that the first user account selected the option to accept the edits to the file; and
provide, to the first client device, an updated version of the file that includes the edits to the file applied by the second user account on the second client device.

* * * * *